US008846253B2

(12) United States Patent
Ishihara et al.

(10) Patent No.: US 8,846,253 B2
(45) Date of Patent: *Sep. 30, 2014

(54) MICROPOROUS MEMBRANES, METHODS FOR MAKING THESE MEMBRANES, AND THE USE OF THESE MEMBRANES AS BATTERY SEPARATOR FILMS

(75) Inventors: Takeshi Ishihara, Nasushiobara (JP); Satoshi Miyaoka, Nasushiobara (JP); Koichi Kono, Nasushiobara (JP); Patrick Brant, Seabrook, TX (US)

(73) Assignee: Toray Battery Separator Film Co., Ltd. (JP)

(*) Notice: Subject to any disclaimer, the term of this patent is extended or adjusted under 35 U.S.C. 154(b) by 266 days.

This patent is subject to a terminal disclaimer.

(21) Appl. No.: 13/322,932

(22) PCT Filed: Jun. 8, 2010

(86) PCT No.: PCT/US2010/037769
§ 371 (c)(1),
(2), (4) Date: Nov. 29, 2011

(87) PCT Pub. No.: WO2010/147802
PCT Pub. Date: Dec. 23, 2010

(65) Prior Publication Data
US 2012/0070748 A1 Mar. 22, 2012

Related U.S. Application Data

(60) Provisional application No. 61/218,720, filed on Jun. 19, 2009, provisional application No. 61/298,752, filed on Jan. 27, 2010, provisional application No. 61/298,756, filed on Jan. 27, 2010, provisional application No. 61/346,675, filed on May 20, 2010, provisional application No. 61/351,380, filed on Jun. 4, 2010.

(51) Int. Cl.
*H01M 2/16* (2006.01)
*B32B 9/04* (2006.01)
*B32B 27/32* (2006.01)
*H01M 2/14* (2006.01)
*H01M 10/0525* (2010.01)

(52) U.S. Cl.
CPC .............. *H01M 2/16* (2013.01); *Y02T 10/7011* (2013.01); *Y02E 60/12* (2013.01); *B32B 27/32* (2013.01); *H01M 10/0525* (2013.01); *H01M 2/1686* (2013.01); *H01M 2/145* (2013.01)
USPC .......................... 429/253; 429/129; 428/315.5

(58) Field of Classification Search
USPC .......... 429/62, 129, 144, 207, 254, 246, 253; 525/240; 264/210.1, 210.2; 428/315.5
See application file for complete search history.

(56) References Cited

U.S. PATENT DOCUMENTS

| 4,873,037 | A | 10/1989 | Chau et al. |
|---|---|---|---|
| 5,084,534 | A | 1/1992 | Welborn, Jr. et al. |
| 5,453,333 | A * | 9/1995 | Takauchi et al. ................ 429/62 |
| 5,534,593 | A * | 7/1996 | Friedman ...................... 525/240 |
| 5,616,246 | A | 4/1997 | Gagnon et al. |
| 6,096,213 | A | 8/2000 | Radovanovic et al. |
| 6,100,334 | A | 8/2000 | Abdou-Sabet |
| 8,338,020 | B2 * | 12/2012 | Ishihara et al. ................ 429/145 |
| 2002/0168564 | A1 * | 11/2002 | Wensley ........................ 429/144 |
| 2006/0204854 | A1 * | 9/2006 | Fujimoto et al. ............... 429/303 |
| 2007/0120526 | A1 * | 5/2007 | Kumeuchi et al. ............. 320/112 |
| 2007/0128512 | A1 * | 6/2007 | Kaimai et al. ................. 429/144 |
| 2007/0160902 | A1 * | 7/2007 | Ando et al. .................... 429/144 |
| 2008/0057388 | A1 | 3/2008 | Kono et al. |
| 2008/0057389 | A1 | 3/2008 | Kono et al. |
| 2009/0134538 | A1 | 5/2009 | Takita et al. |
| 2009/0148761 | A1 | 6/2009 | Kikuchi et al. |
| 2009/0169862 | A1 * | 7/2009 | Rhee et al. ................... 428/315.7 |
| 2009/0186279 | A1 * | 7/2009 | Brant et al. .................... 429/249 |
| 2009/0269672 | A1 | 10/2009 | Takita et al. |
| 2010/0003588 | A1 * | 1/2010 | Sudou et al. .................. 429/129 |

FOREIGN PATENT DOCUMENTS

| JP | 59-196706 | | 11/1984 | | |
|---|---|---|---|---|---|
| JP | 60-242035 | | 12/1985 | | |
| JP | 61-227804 | | 10/1986 | | |
| JP | 07-060084 | | 3/1995 | | |
| JP | 2004018660 | A * | 1/2004 | .............. | C08L 23/26 |
| JP | 2004-161899 | | 6/2004 | | |
| JP | 3634397 | | 1/2005 | | |
| JP | 2005-145999 | | 6/2005 | | |
| JP | 2005/171230 | A1 * | 6/2005 | | |
| WO | 97/23554 | | 7/1997 | | |
| WO | WO 2008/018584 | A1 * | 2/2004 | .............. | H01M 2/16 |
| WO | 2007/037289 | A1 | 4/2007 | | |
| WO | 2007/132942 | | 11/2007 | | |
| WO | 2008/016174 | | 2/2008 | | |
| WO | 2008/016174 | A1 | 2/2008 | | |
| WO | 2008/140835 | | 11/2008 | | |

OTHER PUBLICATIONS

Machine Translation of: JP 2005-171230 A, Masuda et al., Jun. 30, 2005.*
Machine Translation of: JP 2004-018660 A, Maki et al., Jan. 22, 2004.*
Sun, T. et al., "Effect of Short Chain Branching on the Coil Dimensions of Polyolefins in Dilute Solution," *Macromolecules*, 2001, vol. 34, No. 19, pp. 6812-6820 (1 page Abstract).
Patrick Brant et al., "Effect of Tacticity on the Dilute Solution Coil Dimensions of Poly(a-olefin)s", *Macromolecules*, vol. 38, Jul. 6, 2005, pp. 7181-7183, *American Chemical Society*.

* cited by examiner

*Primary Examiner* — Kenneth Douyette
(74) *Attorney, Agent, or Firm* — DLA Piper LLP (US)

(57) ABSTRACT

The invention relates to microporous membranes having high meltdown temperature, high air permeability, and high puncture strength. The invention also relates to the production of such membranes and the use of such membranes as battery separator film.

8 Claims, No Drawings

MICROPOROUS MEMBRANES, METHODS FOR MAKING THESE MEMBRANES, AND THE USE OF THESE MEMBRANES AS BATTERY SEPARATOR FILMS

CROSS-REFERENCE TO RELATED APPLICATIONS

The present application claims priority from U.S. Ser. No. 61/298,756, filed Jan. 27, 2010, and claims the benefit of and priority from U.S. Ser. No. 61/298,752, filed Jan. 27, 2010; U.S. Ser. No. 61/218,720, filed Jun. 19, 2009; U.S. Ser. No. 61/346,675, filed May 20, 2010, and U.S. Ser. No. 61/351,380, filed Jun. 4, 2010, all of which are incorporated by reference in their entirety.

FIELD OF THE INVENTION

The invention relates to microporous membranes having high meltdown temperature, high air permeability, and high puncture strength. The invention also relates to the production of such membranes and the use of such membranes as battery separator film.

BACKGROUND OF THE INVENTION

Microporous membranes are useful as battery separator film ("BSF") for primary and secondary batteries. Such batteries include lithium ion secondary batteries, lithium-polymer secondary batteries, nickel-hydrogen batteries, nickel-cadmium batteries, nickel-zinc batteries, silver-zinc batteries, etc.

It is desirable for a battery separator film to have a relatively low heat shrinkage, especially high temperature, in order to prevent internal short circuits. Microporous membranes having a heat shrinkage in the range of about 1.0% to 10.0% at 105° C. have been made using polyolefin. For example, JP60-242035A discloses a membrane made by a process comprising molding a gel-like sheet made by extruding a solution containing solvent and polyolefin having a weight average molecular weight$\geq 7.0 \times 10^5$, removing the solvent from the gel-like sheet, and then stretching the gel-like sheet.

It is also desirable for microporous membranes to have relatively high air permeability, pin puncture strength, and meltdown temperature. For example, Japanese patent applications JP59-196706A and JP61-227804A disclose the use of polymethylpentene (PMP) to increase membrane meltdown temperature for improved battery safety. These membranes, however, have a relatively high shutdown temperature. Japanese patent applications JP07-060084A and JP3634397B disclose microporous membrane comprising polyethylene and polymethylpentene, the membrane being produced by mixing polyethylene and polymethylpentene with solvent or third polymer. The film is said to have a relatively low shutdown temperature and a relatively high meltdown temperature. Further, U.S. Pat. No. 6,096,213 discloses a method for making membrane comprising polyethylene and polymethylpentene without using any solvent or third polymer. Japanese patent application JP2004-161899A discloses a microporous membrane comprising polyethylene and polymethylpentene having a relatively high air permeability and a low heat shrinkage at 105° C. Japanese patent application JP2005-145999 discloses a microporous membrane comprising polymethylpentene and alpha-olefin copolymer. While polymethylpentene has been used to improve the properties of microporous membranes, further improvements are desired.

SUMMARY OF THE INVENTION

In an embodiment, the invention relates to a membrane comprising polymethylpentene, polypropylene, and polyethylene, the membrane being microporous and having meltdown temperature$\geq 180.0°$ C., a normalized air permeability$\leq 75.0$ seconds/100 cm$^3$/μm, and a pin puncture strength$\geq 0.90 \times 10^2$ mN/μm.

In another embodiment, the invention relates to a process for producing a microporous membrane, comprising:
(1) extruding a mixture of diluent and polymer, the polymer comprising an amount $A_1$ of polymethylpentene, an amount $A_2$ of polypropylene, and an amount $A_3$ of polyethylene, wherein 5.0 wt. %$\leq A_1 <$25.0 wt. %, 5.0 wt. %$\leq A_2 <$25.0 wt. %, and $A_3 \leq$90.0 wt. % with the weight percents being based on the weight of the polymer in the polymer-diluent mixture;
(2) stretching the extrudate in at least one planar direction; and
(3) removing at least a portion of the diluent from the stretched extrudate.

In yet another embodiment, the invention relates to a battery comprising an anode, a cathode, and electrolyte, and battery separator located between the anode and the cathode, the battery separator compromising (i)$\geq 5.0$ wt. % polymethylpentene based on the weight of the battery separator, (ii) polypropylene, and (iii) polyethylene, the membrane having meltdown temperature$\geq 180.0°$ C., a normalized air permeability$\leq 75.0$ seconds/100 cm$^3$/μm, and a pin puncture strength$\geq 0.90 \times 10^2$ mN/μm.

DETAILED DESCRIPTION OF ILLUSTRATIVE EMBODIMENTS

It has been observed that increasing the amount of polymethylpentene in a microporous membrane leads to an increase in the membrane's meltdown temperature and an undesirable decrease in membrane strength and air permeability. In an embodiment, the invention is based in part on the discovery of microporous membranes having relatively high meltdown temperature and improved strength and air permeability. Such membranes comprise polymethylpentene, polypropylene, and polyethylene. In other embodiments, the invention is based in part on the discovery that membrane strength can be further improved when the polypropylene is an isotactic polypropylene having relatively high molecular weight and crystallinity. In other embodiments, the invention is based on the discovery that membrane yield can be increased when the polymethylpentene, polypropylene, and polyethylene in the membrane are combined under mixing conditions defined below, which conditions can be used, e.g., when the membrane is produced from an extrudate of mixed polymer.

For the purpose of this description and the appended claims, the term "polymer" means a composition including a plurality of macromolecules, the macromolecules containing recurring units derived from one or more monomers. The macromolecules can have different size, molecular architecture, atomic content, etc. The term "polymer" includes macromolecules such as copolymer, terpolymer, etc. "Polyethylene" means polyolefin containing$\geq 50\%$ (by number) recurring ethylene-derived units, preferably polyethylene homopolymer and/or polyethylene copolymer wherein at least 85% (by number) of the recurring units are ethylene units. "Polypropylene" means polyolefin containing>50.0% (by number) recurring propylene-derived units, preferably polypropylene homopolymer and/or polypropylene copolymer wherein at least 85% (by number) of the recurring units are propylene units. The term isotactic polypropylene means polypropylene having a meso pentad fraction≥about 50.0 mol. % mmmm pentads, preferably ≥96.0 mol. % mmmm pentads (based on the total number of moles of isotactic polypropylene). "Polymethylpentene" means polyolefin containing 50.0% (by number) recurring methylpentene-derived units, preferably polymethylpentene homopolymer and/or polymethylpentene copolymer wherein at least 85% by (number) of the recurring units are methylpentene units. A "microporous membrane" is a thin film having pores, where ≥90.0 percent (by volume) of the film's pore volume resides in pores having average diameters in the range of from 0.01 µm to 10.0 µm. With respect to membranes produced from extrudates, the machine direction ("MD") is defined as the direction in which an extrudate is produced from a die. The transverse direction ("TD") is defined as the direction perpendicular to both MD and the thickness direction of the extrudate.

Microporous Membrane Composition

In an embodiment, the invention relates to a microporous membrane comprising polymethylpentene, polypropylene, and polyethylene, the membrane being microporous and having meltdown temperature≥180.0° C., a normalized air permeability≤75.0 seconds/100 cm$^3$/µm, and a pin puncture strength≥0.90×10$^2$ mN/µm. In an embodiment, the microporous membrane comprises polymethylpentene, polypropylene, and polyethylene, wherein the amount of polymethylpentene is in the range of 5.0 wt. %≤polymethylpentene<25.0 wt. %, the amount of polypropylene is in the range of 5.0 wt. %≤polypropylene≤25.0 wt. %, and the amount of polyethylene is in the range of 50.0 wt. %<polyethylene≤90.0 wt. %, the weight percents being based on the weight of the membrane. Optionally, the microporous membrane comprises 10.0 wt. %≤polymethylpentene≤25.0 wt. %, 10.0 wt. %≤polypropylene≤25.0 wt. %, and 50.0 wt. %≤polyethylene≤80.0 wt. %.

In any of the preceding embodiments, the membrane can have one or more of the following characteristics: (i) the amount of polymethylpentene (wt. %) in the membrane is ≥the amount of polypropylene (wt. %) in the membrane, the weight percents being based on the weight of the membrane; (ii) the polymethylpentene and polypropylene are present in the membrane in a combined amount≥25.0 wt. %, e.g., in the range of 25.0 wt. % to 35.0 wt. % based on the weight of the membrane; (iii) the polymethylpentene has a Tm≥200.0° C., e.g., in the range of 210° C. to 240° C., e.g., in the range of 223.0° C. to 230.0° C., and an MFR≤80.0 dg/min, e.g., in the range of has 10 dg/min to 40 dg/min, e.g., in the range of 22.0 dg/min to 28.0 dg/min; (iv) the polypropylene is an isotactic polypropylene having a weight average molecular weight ("Mw")≥6.0×10$^5$, e.g., in the range of about 0.8×10$^6$ to about 3.0×10$^6$, such as in the range of about 0.9×10$^6$ to about 2.0×10$^6$, a molecular weight distribution ("MWD" defined as Mw divided by the number average molecular weight ("Mn"))≤20.0, or ≤8.5, or ≤6.0, e.g., in the range of 2.0 to about 8.5, such as in the range of 2.5 to 6.0, and a heat of fusion ("ΔHm")≥90.0 J/g, e.g., in the range of 110 J/g to 120 J/g; (v) the polyethylene has an Mw in the range of 1.0×10$^5$ to 2.0×10$^6$ and a melting point ("Tm")≥130.0° C.; and (vi) polyethylene has an amount of terminal unsaturation≤0.14 per 1.0×10$^4$ carbon atoms. Optionally, the polyethylene is a mixture (e.g., a reactor blend) of a plurality of polyethylenes, e.g., (a)≥45.0 wt. %, e.g., in the range of 50.0 wt. % to 95.0 wt. % of a first polyethylene having an Mw<1.0×10$^6$ and a Tm≥132° C. and (b)≥5.0 wt. % to 55.0 wt. % of a second polyethylene having an Mw≥1.0×10$^6$ and a Tm≥134° C., the weight percents being based on the weight of the polyethylene mixture.

In any of the preceding embodiments, the membrane can have one or more of the following properties: a TD heat shrinkage at 105° C.≤5.0%, a TD heat shrinkage at 130° C.<20.0%, a TD heat shrinkage at 170° C.≤40.0%, a thickness≤25.0 µm, and a porosity in the range of 20% to 80%. For example, in one embodiment, the membrane is a microporous membrane which comprises (i) 25.0 wt. % to 35.0 wt. % of a polyethylene having an Mw≥1.0×10$^6$ and a Tm≥134° C.; (ii) 25.0 wt. % to 35.0 wt. % of a polyethylene having an Mw<1.0×10$^6$ and a Tm≥132° C., (iii) 15.0 wt. % to 24.0 wt. %, e.g., 18.0 wt. % to 22.0 wt. %, of polymethylpentene having a Tm in the range of 223.0° C. to 230.0° C. and an MFR in the range of 22.0 dg/min to 28.0 dg/min; (iv) 15 wt. % to 25 wt. % of isotactic polypropylene having an Mw in the range of about 0.9×10$^6$ to about 2.0×10$^6$, an MWD in the range of about 2.0 to about 8.5 and a ΔHm in the range of 110 J/g to 120 J/g. Such a microporous membrane can have e.g., one or more of (and optionally all of) the following properties: a thickness in the range of 15.0 µm to 30.0 µm; a meltdown temperature in the range of 190° C. to 210° C., e.g., 197° C. to 205° C.; a 105° C. TD heat shrinkage≤0.5%, e.g., in the range of 0.01% to 0.5%; a 130° C. TD heat shrinkage≤10.0%, in the range of 1.0% to 7.5%; a normalized air permeability≤30 seconds/100 cm$^3$/µm, e.g., in the range of 10 seconds/100 cm$^3$/µm to 30 seconds/100 cm$^3$/µm; a porosity in the range 30.0% to 60.0%, and a normalized pin puncture strength≥1.0×10$^2$ mN/µm, e.g., in the range of 1.0×10$^2$ mN/µm to 2.5×10$^2$ mN/µm. The embodiments of the preceding invention serve to amplify certain aspects of the invention, but the invention is not limited thereto, and this description of these embodiments is not meant to foreclose other embodiments within the broader scope of the invention. The microporous membrane comprises polymers, and these polymers will now be described in more detail.

Polymethylpentene

In an embodiment, the polymethylpentene ("PMP") comprises polymer or copolymer wherein at least 80.0% (by number) of the recurring units are methylpentene units. The desired PMP has a melting temperature (Tm)≥200.0° C., e.g., in the range of from about 200.0° C. to about 250.0° C., such as from about 210.0° C. to about 240.0° C., or from about 220.0° C. to about 230.0° C. It has been observed that when the membrane contains PMP having a Tm>240.0° C., and particularly >250.0° C., it is more difficult to produce a membrane that does not exhibit a loss of mechanical strength when the membrane is exposed to a temperature>170.0° C. While not wishing to be bound by any theory or model, it is believed that this results from the difficulty in producing a uniform mixture of PMP and PE when the difference between PE Tm and PMP Tm is large. It has also been observed that when the membrane contains PMP having a Tm<200.0° C., it is more difficult to produce a membrane having a relatively high meltdown temperature. The PMP's Tm can be determined by differential scanning calorimetry methods similar to those described below for polypropylene, as exemplified in "*Macromolecules, Vol.* 38, pp. 7181-7183 (2005)."

In an embodiment, the PMP has a melt flow rate ("MFR") measured according to ASTM D 1238; 260° C./5.0 kg)≤80.0 dg/min., for example from about 0.5 dg/min. to about 60.0 dg/min., such as from about 1 dg/min. to about 30 dg/min., e.g., in the range of about 10 dg/min to about 40 dg/min. When the MFR of PMP is >80.0 dg/min., it can be more difficult to produce a membrane having a relatively high meltdown temperature. In one or more embodiments, the PMP has an Mw in the range of $1.0\times10^4$ to $4.0\times10^6$. The PMP's Mw can be determined by gel permeation chromatography methods similar to those described below for polypropylene.

The PMP can be produced, e.g., in a polymerization process using a Ziegler-Natta catalyst system (such as catalyst systems containing titanium or titanium and magnesium) or a "single site catalyst". In an embodiment, the PMP is produced using methylpentene-1 monomer, such as 4-methylpentene-1, or methylpentene-1 with one or more comonomers, such as α-olefin by coordination polymerization. Optionally, the α-olefin is one or more of butane-1, pentene-1,3-methylbutene-1, hexene-1,4-methylpentene-1, heptene-1, octane-1, nonene-1, and decene-1. Cyclic comonomer(s) such as cyclopentene, 4-methylcyclopentene, norbornene, tricyclo-3-decene, etc., can also be used. In an embodiment, the comonomer is hexene-1. The comonomer content in the PMP is generally 20.0 mol. %.

The PMP can be a mixture of PMPs (e.g., dry mixed or a reactor blend), to produce a mixture having a Tm≤250.0° C., e.g., ≤240.0° C.

Polyethylene

In particular embodiments, the polyethylene ("PE") can comprise a mixture or reactor blend of polyethylene, such as a mixture of two or more polyethylenes ("PE1", "PE2", "PE3", "PE4", etc., as described below). For example, the PE may include a blend of (i) a first PE (PE1) and/or a second PE (PE2) and (ii) a fourth PE (PE4). Optionally these embodiments can further include a third PE (PE3).

PE1

In an embodiment, the first PE ("PE1") can be, e.g., a PE having an Mw<$1.0\times10^6$, e.g., in the range of from about $1.0\times10^5$ to about $0.90\times10^6$; an MWD≤50.0, e.g., in the range of from about 2.0 to about 50.0; and a terminal unsaturation amount<0.20 per $1.0\times10^4$ carbon atoms. Optionally, PE1 has an Mw in the range of from about $4.0\times10^5$ to about $6.0\times10^5$, and an MWD of from about 3.0 to about 10.0. Optionally, PE1 has an amount of terminal unsaturation≤0.14 per $1.0\times10^4$ carbon atoms, or ≤0.12 per $1.0\times10^4$ carbon atoms, e.g., in the range of 0.05 to 0.14 per $1.0\times10^4$ carbon atoms (e.g., below the detection limit of the measurement). PE1 can be, e.g., SUNFINE® SH-800® or SH-810® high density PE, available from Asahi Kasei Chemicals Corporation.

PE2

In an embodiment, the second PE ("PE2") can be, e.g., PE having an Mw<$1.0\times10^6$, e.g., in the range of from about $2.0\times10^5$ to about $0.9\times10^6$, an MWD≤50.0, e.g., in the range of from about 2 to about 50, and a terminal unsaturation amount≥0.20 per $1.0\times10^4$ carbon atoms. Optionally, PE2 has an amount of terminal unsaturation≥0.30 per $1.0\times10^4$ carbon atoms, or ≥0.50 per $1.0\times10^4$ carbon atoms, e.g., in the range of 0.6 to 10.0 per $1.0\times10^4$ carbon atoms. A non-limiting example of PE2 is one having an Mw in the range of from about $3.0\times10^5$ to about $8.0\times10^5$, for example about $7.5\times10^5$, and an MWD of from about 4 to about 15. PE2 can be, e.g., Lupolen®, available from Basell.

PE1 and/or PE2 can be, e.g., an ethylene homopolymer or an ethylene/α-olefin copolymer containing≤5.0 mole % of one or more comonomer such as α-olefin, based on 100% by mole of the copolymer. Optionally, the α-olefin is one or more of propylene, butene-1, pentene-1, hexene-1,4-methylpentene-1, octene-1, vinyl acetate, methyl methacrylate, or styrene. Such a PE can have a melting point≥132° C. PE1 can be produced, e.g., in a process using a Ziegler-Natta or single-site polymerization catalyst, but this is not required. The amount of terminal unsaturation can be measured in accordance with the procedures described in PCT Publication WO 97/23554, for example. PE2 can be produced using a chromium-containing catalyst, for example.

PE3

In an embodiment, PE3 can be, e.g., PE having a Tm≤130.0° C. Using PE3 having a Tm≤130.0° C. can provide the finished membrane with a desirably low shutdown temperature, e.g., a shutdown temperature≤130.5° C.

Optionally, PE3 has a Tm≥85.0° C., e.g., in the range of from 105.0° C. to 130.0° C., such as 115.0° C. to 126.0° C. Optionally, the PE3 has an Mw≥$5.0\times10^5$, e.g., in the range of from $1.0\times10^3$ to $4.0\times10^5$, such as in the range of from $1.5\times10^3$ to about $3.0\times10^5$. Optionally, the PE3 has an MWD≤5.0, e.g., in the range of from 2.0 to 5.0, e.g., 1.8 to 3.5. Optionally, PE3 has a mass density in the range of 0.905 g/cm³ to 0.935 g/cm³. Polyethylene mass density is determined in accordance with ASTM D1505.

In an embodiment, PE3 is a copolymer of ethylene and ≤5.0 mol. % of a comonomer such as one or more of propylene, butene-1, pentene-1, hexene-1,4-methylpentene-1, octene-1, vinyl acetate, methyl methacrylate, styrene, or other monomer. Optionally, the comonomer amount is in the range of 1.0 mol. % to 5.0 mol. %. In an embodiment, the comonomer is hexene-1 and/or octene-1.

PE3 can be produced in any convenient process, such as those using a Ziegler-Natta or single-site polymerization catalyst. Optionally, PE3 is one or more of a low density polyethylene ("LDPE"), a medium density polyethylene, a branched LDPE, or a linear LDPE, such as a PE produced by metallocene catalyst. PE3 can be produced according to the methods disclosed in U.S. Pat. No. 5,084,534 (such as the methods disclosed therein in examples 27 and 41), which is incorporated by reference herein in its entirety.

PE4

In an embodiment, the fourth PE ("PE4") can be, e.g., PE having an Mw≥$1.0\times10^6$, e.g., in the range of from about $1.0\times10^6$ to about $5.0\times10^6$ and an MWD of from about 1.2 to about 50.0. A non-limiting example of PE4 is one having an Mw of from about $1.0\times10^6$ to about $3.0\times10^6$, for example about $2.0\times10^6$, and an MWD≤20.0, e.g., of from about 2.0 to about 20.0, preferably about 4.0 to about 15.0. PE4 can be, e.g., an ethylene homopolymer or an ethylene/α-olefin copolymer containing≤5.0 mole % of one or more comonomers such as α-olefin, based on 100% by mole of the copolymer. The comonomer can be, for example, one or more of, propylene, butene-1, pentene-1, hexene-1,4-methylpentene-1, octene-1, vinyl acetate, methyl methacrylate, or styrene. Such a polymer or copolymer can be produced using a Ziegler-Natta or a single-site catalyst, though this is not required. Such a PE can have a melting point≥134° C. PE4 can be ultra-high molecular weight polyethylene ("UHMWPE"), e.g., HI-ZEX MILLION® 240-m® polyethylene, available from Mitsui Chemicals, Inc. The melting points of PE1-PE4 can be determined using the methods disclosed in PCT Patent Publication No. WO 2008/140835, for example.

In an embodiment, the PE is a mixture of polyethylenes, e.g., a mixture of (a) PE1 and/or PE4, (b) PE4, and, optionally, (c) PE3. For example, the membrane can comprise≥45.0 wt. %, e.g., in the range of 45.0 wt. % to 95.0 wt. % of PE1; ≤30.0 wt. % PE2, ≤30.0 wt. % PE3, and ≥5.0 wt. %, e.g., 5.0 wt. % to 55.0 wt. % of PE4, the weight percents being based on the weight of the PE mixture. Optionally, the amount of PE1 is in the range of 50.0 wt. % to 65.0 wt. % and the amount of PE4 is in the range of 35.0 wt. % to 50.0 wt. %, based on the weight of the PE mixture.

In an embodiment, the membrane is substantially free of PE2. In another embodiment, the membrane is substantially free of PE3. In yet another embodiment, the membrane is substantially free of both PE1 and PE3. Substantially free in this context means the membrane contains≤0.1 wt. % of the designated species.

Polypropylene

In an embodiment, the polypropylene ("PP") can be, e.g., polypropylene having an Mw≥6.0×10$^5$, such as ≥7.5×10$^5$, for example in the range of from about 0.8×10$^6$ to about 3.0×10$^6$, such as in the range of from 0.9×10$^6$ to 2.0×10$^6$. Optionally, the PP has a Tm≥160.0° C. and a ΔHm≥90.0 J/g, e.g., ≥100.0 J/g, such as in the range of from 110 J/g to 120 J/g. Optionally, the PP has an MWD≤20.0, e.g., in the range of from about 1.5 to about 10.0, such as in the range of from about 2.0 to about 8.5. Optionally, the PP is a copolymer (random or block) of propylene and ≤5.0 mol. % of a comonomer, the comonomer being, e.g., one or more α-olefins such as ethylene, butene-1, pentene-1, hexene-1,4-methylpentene-1, octene-1, vinyl acetate, methyl methacrylate, and styrene, etc.; or diolefins such as butadiene, 1,5-hexadiene, 1,7-octadiene, 1,9-decadiene, etc.

In an embodiment the PP is isotactic polypropylene. In an embodiment, the PP has (a) a meso pentad fraction≥about 90.0 mol. % mmmm pentads, optionally≥96.0 mol. % mmmm pentads, preferably ≥96.0 mol. % mmmm pentads; and (b) has an amount of stereo defects≤about 50.0 per 1.0×10$^4$ carbon atoms, e.g., ≤about 20 per 1.0×10$^4$ carbon atoms, or ≤about 10.0 per 1.0×10$^4$ carbon atoms, such as ≤about 5.0 per 1.0×10$^4$ carbon atoms. Optionally, the PP has one or more of the following properties: (i) a Tm≥162.0° C.; (ii) an elongational viscosity≥about 5.0×10$^4$ Pa sec at a temperature of 230° C. and a strain rate of 25 sec$^{-1}$; (iii) a Trouton's ratio≥about 15 when measured at a temperature of about 230° C. and a strain rate of 25 sec$^{-1}$; (iv) a Melt Flow Rate ("MFR"; ASTM D-1238-95 Condition L at 230° C. and 2.16 kg)≤about 0.1 dg/min, e.g., ≤about 0.01 dg/min (i.e., a value is low enough that the MFR is essentially not measurable); or (v) an amount extractable species (extractable by contacting the PP with boiling xylene)≤0.5 wt. %, e.g., ≤0.2 wt. %, such as ≤0.1 wt. % or less based on the weight of the PP.

In an embodiment, the PP is an isotactic PP having an Mw in the range of from about 0.9×10$^6$ to about 2.0×10$^6$, an MWD≤8.5, e.g., in the range of from 2.0 to 8.5, e.g., in the range of from 2.5 to 6.0, and a ΔHm≥90.0 J/g. Generally, such a PP has a meso pentad fraction≥94.0 mol. % mmmm pentads, an amount of stereo defects≤about 5.0 per 1.0×10$^4$ carbon atoms, and a Tm≥162.0° C.

A non-limiting example of the PP, and methods for determining the PP's Tm, meso pentad fraction, tacticity, intrinsic viscosity, Trouton's ratio, stereo defects, and amount of extractable species are described in PCT Patent Publication No. WO 2008/140835, which is incorporated by reference herein in its entirety.

The PP's ΔHm, is determined by the methods disclosed in PCT Patent Publication No. WO 2007/132942, which is incorporated by reference herein in its entirety. Tm can be determined from differential scanning calorimetric (DSC) data obtained using a PerkinElmer Instrument, model Pyris 1 DSC. Samples weighing approximately 5.5-6.5 mg are sealed in aluminum sample pans. The DSC data are recorded by first heating the sample to 230° C. at a rate of 10° C./minute, called first melt (no data recorded). The sample is kept at 230° C. for 10 minutes before a cooling-heating cycle is applied. The sample is then cooled from about 230° C. to about 25° C. at a rate of 10° C./minute, called "crystallization", then kept at 25° C. for 10 minutes, and then heated to 230° C. at a rate of 10° C./minute, called ("second melt"). The thermal events in both crystallization and second melt are recorded. The melting temperature ($T_m$) is the peak temperature of the second melting curve and the crystallization temperature ($T_c$) is the peak temperature of the crystallization peak.

Other Species

Optionally, inorganic species (such as species containing silicon and/or aluminum atoms), and/or heat-resistant polymers such as those described in PCT Publications WO 2007/132942 and WO 2008/016174 (both of which are incorporated by reference herein in their entirety) can be present in the membrane. In an embodiment, the membrane contains 1.0 wt. % of such materials, based on the weight of the membrane.

A small amount of diluent or other species, e.g., as processing aids, can also be present in the first and/or second layer materials, generally in amounts less than 1.0 wt. % based on the weight of the layer material.

When the microporous membrane is produced by extrusion, the final microporous membrane generally comprises the polymer used to produce the extrudate. A small amount of diluent or other species introduced during processing can also be present, generally in amounts less than 1 wt. % based on the weight of the membrane. A small amount of polymer molecular weight degradation might occur during processing, but this is acceptable. In a form, molecular weight degradation during processing, if any, causes the value of MWD of the polymer in the membrane to differ from the MWD of the polymer used to produce the membrane (e.g., before extrusion) by no more than, e.g., about 10%, or no more than about 1%, or no more than about 0.1%.

Mw and MWD Determination

Polymer Mw and MWD can be determined using a High Temperature Size Exclusion Chromatograph, or "SEC", (GPC PL 220, Polymer Laboratories), equipped with a differential refractive index detector (DRI). The measurement is made in accordance with the procedure disclosed in "*Macromolecules*, Vol. 34, No. 19, pp. 6812-6820 (2001)." Three PLgel Mixed-B columns (available from Polymer Laboratories) are used for the Mw and MWD determination. For PE, the nominal flow rate is 0.5 cm$^3$/min; the nominal injection volume is 300 μL; and the transfer lines, columns, and the DRI detector are contained in an oven maintained at 145° C. For PP and PMP, the nominal flow rate is 1.0 cm$^3$/min; the nominal injection volume is 300 μL; and the transfer lines, columns, and the DRI detector are contained in an oven maintained at 160° C.

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. The same solvent is used as the SEC eluent. Polymer solutions are prepared by placing dry polymer in a glass container, adding the desired amount of the TCB solvent, and then heating the mixture at 160° C. with continuous agitation for about 2 hours. The concentration of polymer solution is 0.25 to 0.75 mg/ml. Sample solutions are filtered off-line before injecting to GPC with 2 μm filter using a model SP260 Sample Prep Station (available from Polymer Laboratories).

The separation efficiency of the column set is calibrated with a calibration curve generated using seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (logMp vs. retention volume) is generated by recording the retention volume at the peak in the DRI signal for each PS standard and fitting this data set to a 2nd-order polynomial. Samples are analyzed using IGOR Pro, available from Wave Metrics, Inc.

Methods for producing the microporous membranes will now be described in more detail. While the invention is described in terms of a monolayer membrane produced by extrusion, the invention is not limited thereto, and this description is not meant to foreclose other embodiments within the broader scope of the invention.

Membrane Production Method

In one or more embodiments, the microporous membranes can be produced by combining PMP, PP, and PE (e.g., by dry blending or melt mixing) with diluent and optional constituents such as inorganic fillers to form a mixture and then extruding the mixture to form an extrudate. At least a portion of the diluent is removed from the extrudate to form the microporous membrane. For example, a blend of PMP, PP, and PE can be combined with diluent such as liquid paraffin to form a mixture, with the mixture being extruded to form a monolayer membrane. Additional layers can be applied to the extrudate, if desired, e.g., to provide the finished membrane with a low shutdown functionality. In other words, monolayer extrudates or monolayer microporous membranes can be laminated or coextruded to form multilayered membranes.

The process for producing the membrane can further comprise optional steps for, e.g., removing at least a portion of any remaining volatile species from the membrane at any time after diluent removal, subjecting the membrane to a thermal treatment (such as heat setting or annealing) before or after diluent removal, stretching the extrudate in at least one planar direction before diluent removal, and/or stretching the membrane in at least one planar direction after diluent removal. An optional hot solvent treatment step, an optional heat setting step, an optional cross-linking step with ionizing radiation, and an optional hydrophilic treatment step, etc., as described in PCT Publication WO 2008/016174 can be conducted if desired. Neither the number nor order of the optional steps is critical.

Producing the Polymer-Diluent Mixture

In one or more embodiments, PMP, PP, and PE (as described above) are combined to form a polymer blend and the blend is combined with diluent (which can be a mixture of diluents, e.g., a solvent mixture) to produce a polymer-diluent mixture. Mixing can be conducted in, e.g., in an extruder such as a reaction extruder. Such extruders include, without limitation, twin-screw extruders, ring extruders, and planetary extruders. Practice of the invention is not limited to the type of reaction extruder employed. Optional species can be included in the polymer-diluent mixture, e.g., fillers, antioxidants, stabilizers, and/or heat-resistant polymers. The type and amounts of such optional species can be the same as described in PCT Publications WO 2007/132942, WO 2008/016174, and WO 2008/140835, all of which are incorporated by reference herein in their entirety.

The diluent is generally compatible with the polymers used to produce the extrudate. For example, the diluent can be any species or combination of species capable of forming a single phase in conjunction with the resin at the extrusion temperature. Examples of the diluent include one or more of aliphatic or cyclic hydrocarbon such as nonane, decane, decalin and paraffin oil, and phthalic acid ester such as dibutyl phthalate and dioctyl phthalate. Paraffin oil with a kinetic viscosity of 20-200 cSt at 40° C. can be used, for example. The diluent can be the same as those described in U.S. Patent Publication Nos. 2008/0057388 and 2008/0057389, both of which are incorporated by reference in their entirety.

In an embodiment, the blended polymer in the polymer-diluent mixture compresses an amount $A_1$ of PMP, an amount $A_2$ of PP, and an amount $A_3$ of PE, wherein 5.0 wt. %$\leq A_1 <$25.0 wt. %, 5.0 wt. %$\leq A_2 <$25.0 wt. %, and $A_3 \leq$90.0 wt. % with the weight percents being based on the weight of the polymer in the polymer-diluent mixture. Optionally, $A_1$ is in the range of 10.0 wt. %$\leq A_1 <$25.0 wt. %, $A_2$ is in the range of 10.0 wt. %$\leq A_2 <$25.0 wt. %, and $A_3$ is in the range of 50.0 wt. %$< A_3 <$80.0 wt. %. Optionally, $A_1 \geq A_2$ and/or $A_1 + A_2 \geq$25.0 wt. %.

Optionally, PMP has a Tm in the range of 200.0° C. to 250.0° C. and an MFR$\leq$80.0 dg/min. Optionally, the PP is an isotactic polypropylene having an Mw$\geq 6.0 \times 10^5$, an MWD$\leq$8.5 and a $\Delta$Hm$\geq$90.0 J/g. Optionally, the PE has an Mw in the range of $1.0 \times 10^5$ to $2.0 \times 10^6$ and a Tm$\geq$130.0° C.

In an embodiment, the polymer and diluent are combined using a mixing energy<0.50 KWh/kg, e.g., in the range of 0.20 KWh/kg>mixing energy$\geq$0.39 KWh/kg. It has been discovered that when the mixing energy in this range, it is possible to stretch the extrudate to a greater magnification without tearing, which leads to both (a) higher membrane yield from the process and (b) higher strength in the finished membrane. Mixing energy has the units Kilowatt hour/kilogram. While not wishing to be bound by any theory or model, it is believed that utilizing a mixing energy$\leq$0.50 KWh/kg provides improved dispersion of the PMP in the mixture, thereby providing the membrane with technologically useful puncture strength. For example, in one embodiment, the membrane comprises substantially homogenous polymer (e.g., substantially no phase separation of polymer species), e.g., the membrane is substantially free of polymeric domains of PE, PP, or PMP having a diameter$\geq$10 nm. Optionally, $\leq$0.01 wt. %, such as $\leq$0.001 wt. %, of the polymer in the membrane resides in domains having a diameter$\geq$10 nm, based on the total weight of polymer in the membrane.

It is also believed that utilizing a 0.20 KWh/kg>mixing energy$\geq$0.39 KWh/kg lessens the amount of polymer degradation and maintains advantageous operating characteristics such as useful permeability. At higher mixing energy, polymer molecular weight degradation is believed to occur (e.g., by shear thinning during mixing), and poor permeability is observed.

In one or more embodiments, the polyolefins are mixed within an extruder operating at $\leq$400 rpm, in other embodiments$\leq$350 rpm, in other embodiments$\leq$300 rpm, in other embodiments$\leq$275 rpm, in other embodiments$\leq$250 rpm, and in other embodiments$\leq$225 rpm. In an embodiment, the polymer-diluent mixture during extrusion is exposed to a temperature in the range of 140° C. to 250° C., e.g., 210° C. to 240° C. In an embodiment, the amount of diluent used to produce the extrudate is in the range, e.g., of from about 20.0 wt. % to about 99.0 wt. % based on the weight of the polymer-diluent mixture, with the balance being polymer. For example, the amount of diluent can be in the range of about 60.0 wt. % to about 80.0 wt. %.

Producing the Extrudate

In a form, the polymer-diluent mixture is conducted from an extruder through a die to produce the extrudate. The extrudate should have an appropriate thickness to produce, after the stretching steps, a final membrane having the desired thickness (generally $\geq$1.0 µm). For example, the extrudate can have a thickness in the range of about 0.1 mm to about 10.0 mm, or about 0.5 mm to 5 mm. Extrusion is generally conducted with the polymer-diluent mixture in the molten state. When a sheet-forming die is used, the die lip is generally heated to an elevated temperature, e.g., in the range of 140° C. to 250° C. Suitable process conditions for accomplishing the extrusion are disclosed in PCT Publications WO 2007/132942 and WO 2008/016174.

If desired, the extrudate can be exposed to a temperature in the range of about 15° C. to about 25° C. to form a cooled extrudate. Cooling rate is not particularly critical. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Publications No. WO 2007/132942, WO 2008/016174, and WO 2008/140835, for example.

Stretching the Extrudate (Upstream Stretching)

The extrudate or cooled extrudate can be stretched (also called upstream orientation when the stretching results in orientation of the polymer in the extrudate) in at least one direction. The extrudate can be stretched by, for example, a tenter method, a roll method, an inflation method or a combination thereof, as described in PCT Publication No. WO 2008/016174, for example. The stretching may be conducted monoaxially or biaxially, though the biaxial stretching is preferable. In the case of biaxial stretching, any of simultaneous biaxial stretching, sequential stretching or multi-stage stretching (for instance, a combination of the simultaneous biaxial stretching and the sequential stretching) can be used, though simultaneous biaxial stretching is preferable. When biaxial stretching is used, the amount of magnification need not be the same in each stretching direction.

The stretching magnification can be, for example, 2 fold or more, preferably 3 to 30 fold in the case of monoaxial stretching. In the case of biaxial stretching, the stretching magnification can be, for example, 3 fold or more in any direction, namely 9 fold or more, such as 16 fold or more, e.g., 25 fold or more, in area magnification. An example for this stretching step would include stretching from about 9 fold to about 49 fold in area magnification. Again, the amount of stretch in either direction need not be the same. The magnification factor operates multiplicatively on film size. For example, a film having an initial width (TD) of 2.0 cm that is stretched in TD to a magnification factor of 4 fold will have a final width of 8.0 cm.

The stretching can be conducted while exposing the extrudate to a temperature (the upstream orientation temperature) in the range of from about the Tcd temperature to Tm, where Tcd and Tm are defined as the crystal dispersion temperature and melting point of the PE having the lowest melting point among the polyethylenes used to produce the extrudate (generally the PE such as PE1 or PE3). The crystal dispersion temperature is determined by measuring the temperature characteristics of dynamic viscoelasticity according to ASTM D 4065. In an embodiment where Tcd is in the range of about 90° C. to about 100° C., the stretching temperature can be from about 90° C. to 125° C.; e.g., from about 100° C. to 125° C., such as from 105° C. to 125° C.

When the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infra-red heating in an oven, etc., can be used with or instead of heated air.

Diluent Removal

In a form, at least a portion of the diluent is removed (or displaced) from the stretched extrudate to form a dried membrane. A displacing (or "washing") solvent can be used to remove (wash away, or displace) the diluent, as described in PCT Publication No. WO 2008/016174, for example.

In an embodiment, at least a portion of any remaining volatile species (e.g., washing solvent) is removed from the dried membrane after diluent removal. Any method capable of removing the washing solvent can be used, including conventional methods such as heat-drying, wind-drying (moving air), etc. Process conditions for removing volatile species such as washing solvent can be the same as those disclosed in PCT Publication No. WO 2008/016174, for example.

Stretching the Membrane (Downstream Stretching)

The dried membrane can be stretched (also called "dry stretching" or dry orientation since at least a portion of the diluent has been removed or displaced) in at least TD. Before dry stretching, the dried membrane has an initial size in MD (a first dry length) and an initial size in TD (a first dry width). As used herein, the term "first dry width" refers to the size of the dried membrane in TD prior to the start of dry orientation. The term "first dry length" refers to the size of the dried membrane in MD prior to the start of dry orientation. Tenter stretching equipment of the kind described in WO 2008/016174 can be used, for example.

The dried membrane can be stretched in MD from the first dry length to a second dry length that is larger than the first dry length by a magnification factor (the "MD dry stretching magnification factor") in the range of from about 1.1 to about 1.6, e.g., in the range of 1.1 to 1.5. When TD dry stretching is used, the dried membrane can be stretched in TD from the first dry width to a second dry width that is larger than the first dry width by a magnification factor (the "TD dry stretching magnification factor"). Optionally, the TD dry stretching magnification factor is ≤the MD dry stretching magnification factor. The TD dry stretching magnification factor can be in the range of from about 1.1 to about 1.6. The dry stretching (also called re-stretching since the diluent-containing extrudate has already been stretched) can be sequential or simultaneous in MD and TD. Since TD heat shrinkage generally has a greater effect on battery properties than does MD heat shrinkage, the amount of TD magnification generally does not exceed the amount of MD magnification. When biaxial dry stretching is used, the dry stretching can be simultaneous in MD and TD or sequential. When the dry stretching is sequential, generally MD stretching is conducted first, followed by TD stretching.

The dry stretching can be conducted while exposing the dried membrane to a temperature (the downstream orientation temperature)≤Tm, e.g., in the range of from about Tcd-30° C. to Tm. In a form, the stretching temperature is conducted with the membrane exposed to a temperature in the range of from about 70° C. to about 135° C., for example from about 120° C. to about 132° C., such as from about 128° C. to about 132° C.

In a form, the MD stretching magnification is in the range of from about 1.0 to about 1.5, such as 1.2 to 1.4; the TD dry stretching magnification is ≤1.6, e.g. in the range of from about 1.1 to about 1.55, such as 1.15 to 1.5, or 1.2 to 1.4; the MD dry stretching is conducted before the TD dry stretching, and the dry stretching is conducted while the membrane is exposed to a temperature in the range of about 80° C. to about 132° C., e.g., in the range of about 122° C. to about 130° C.

The stretching rate is preferably 3%/second or more in the stretching direction (MD or TD), and the rate can be independently selected for MD and TD stretching. The stretching rate is preferably 5%/second or more, more preferably 10%/second or more, e.g., in the range of 5%/second to 25%/second. Though not particularly critical, the upper limit of the stretching rate is preferably 50%/second to prevent rupture of the membrane.

Controlled Reduction of the Membrane's Width

Following the dry stretching, the dried membrane can be subjected to a controlled reduction in width from the second dry width to a third dry width, the third dry width being in the range of from the first dry width to about 1.1 times larger than the first dry width. The width reduction generally conducted while the membrane is exposed to a temperature≥Tcd −30° C., but no greater than Tm. For example, during width reduction the membrane can be exposed to a temperature in the range of from about 70° C. to about 135° C., such as from about 122° C. to about 132° C., e.g., from about 125° C. to about 130° C. The temperature can be the same as the downstream orientation temperature. In a form, the decreasing of the membrane's width is conducted while the membrane is exposed to a temperature that is lower than Tm. In a form, the third dry width is in the range of from 1.0 times larger than the first dry width to about 1.4 times larger than the first dry width.

It is believed that exposing the membrane to a temperature during the controlled width reduction that is ≥the temperature to which the membrane was exposed during the TD dry stretching leads to greater resistance to heat shrinkage in the finished membrane.

Heat Set

Optionally, the membrane is thermally treated (heat-set) at least once following diluent removal, e.g., after dry stretching, the controlled width reduction, or both. It is believed that heat-setting stabilizes crystals and makes uniform lamellas in the membrane. In a form, the heat setting is conducted while exposing the membrane to a temperature in the range Tcd to Tm, e.g., a temperature in the range of from about 100° C. to about 135° C., such as from about 120° C. to about 132° C., or from about 122° C. to about 130° C. The heat set temperature can be the same as the downstream orientation temperature. Generally, the heat setting is conducted for a time sufficient to form uniform lamellas in the membrane, e.g., a time≤1000 seconds, e.g., in the range of 1 to 600 seconds. In a form, the heat setting is operated under conventional heat-set "thermal fixation" conditions. The term "thermal fixation" refers to heat-setting carried out while maintaining the length and width of the membrane substantially constant, e.g., by holding the membrane's perimeter with tenter clips during the heat setting.

Optionally, an annealing treatment can be conducted after the heat-set step. The annealing is a heat treatment with no load applied to the membrane, and can be conducted by using, e.g., a heating chamber with a belt conveyer or an air-floating-type heating chamber. The annealing may also be conducted continuously after the heat-setting with the tenter slackened. During annealing, the membrane can be exposed to a temperature in the range of Tm or lower, e.g., in the range from about 60° C. to about Tm −5° C. Annealing is believed to provide the microporous membrane with improved permeability and strength.

Optional heated roller, hot solvent, crosslinking, hydrophilizing, and coating treatments can be conducted, if desired, e.g., as described in PCT Publication No. WO 2008/016174.

Structure and Properties of Membrane

The membrane is microporous membrane that is permeable to liquid (aqueous and non-aqueous) at atmospheric pressure. Thus, the membrane can be used as a battery separator, filtration membrane, etc. The thermoplastic film is particularly useful as a BSF for a secondary battery, such as a nickel-hydrogen battery, nickel-cadmium battery, nickel-zinc battery, silver-zinc battery, lithium-ion battery, lithium-ion polymer battery, etc. In an embodiment, the invention relates to lithium-ion secondary batteries containing BSF comprising the thermoplastic film. Such batteries are described in PCT Patent Publication WO 2008/016174, which is incorporated herein by reference in its entirety. Optionally, the membrane can have one or more of the following properties.

Thickness

In an embodiment, the thickness of the final membrane is $\geq 1.0$ μm, e.g., in the range of about 1.0 μm to about $1.0 \times 10^2$ μm. For example, a monolayer membrane can have a thickness in the range of about 1.0 μm to about 30.0 μm, and a multilayer membrane can have a thickness in the range of 7.0 μm to 30.0 μm, but these values are merely representative. The membrane's thickness can be measured, e.g., by a contact thickness meter at 1 cm longitudinal intervals over the width of 10 cm, and then averaged to yield the membrane thickness. Thickness meters such as a Model RC-1 Rotary Caliper, available from Maysun, Inc., 746-3 Gokanjima, Fuji City, Shizuoka, Japan 416-0946 or a "Litematic" available from Mitsutoyo Corporation, are suitable. Non-contact thickness measurement methods are also suitable, e.g., optical thickness measurement methods. In an embodiment, the membrane has a thickness≤30.0 μm.

Porosity≥20.0%

The membrane's porosity is measured conventionally by comparing the membrane's actual weight to the weight of an equivalent non-porous membrane of 100% polymer (equivalent in the sense of having the same polymer composition, length, width, and thickness). Porosity is then determined using the formula: Porosity %=100×(w2−w1)/w2, where "w1" is the actual weight of the membrane, and "w2" is the weight of an equivalent non-porous membrane (of the same polymers) having the same size and thickness. In a form, the membrane's porosity is in the range of 25.0% to 85.0%.

Normalized Air Permeability≤75.0 Seconds/100 cm³/μm

In an embodiment, the membrane has a normalized air permeability≤75.0 seconds/100 cm³/1.0 μm (as measured according to JIS P8117), such as ≤50.0 seconds/100 cm³/1.0 μm, e.g., ≤30.0 seconds/100 cm³/1.0 μm. Optionally, the membrane has a normalized air permeability in the range of 10.0 seconds/100 cm³/1.0 μm to 30.0 seconds/100 cm³/1.0 μm. Since the air permeability value is normalized to the value for an equivalent membrane having a film thickness of 1.0 μm, the membrane's air permeability value is expressed in units of "seconds/100 cm³/1.0 μm". Optionally, the membrane's normalized air permeability is in the range of from about 1.0 seconds/100 cm³/1.0 μm to about 25 seconds/100 cm³/1.0 μm. Normalized air permeability is measured according to JIS P8117, and the results are normalized to the permeability value of an equivalent membrane having a thickness of 1.0 μm using the equation $A=1.0 \mu m \ast (X)/T_1$, where X is the measured air permeability of a membrane having an actual thickness $T_1$ and A is the normalized air permeability of an equivalent membrane having a thickness of 1.0 μm.

Normalized Pin Puncture Strength≥$0.90 \times 10^2$ mN/μm

The membrane's pin puncture strength is expressed as the pin puncture strength of an equivalent membrane having a thickness of 1.0 μm and a porosity of 50% [mN/μm]. Pin puncture strength is defined as the maximum load measured at ambient temperature when the membrane having a thickness of $T_1$ is pricked with a needle of 1 mm in diameter with a spherical end surface (radius R of curvature: 0.5 mm) at a speed of 2 mm/second. The pin puncture strength ("S") is normalized to the pin puncture strength value of an equivalent membrane having a thickness of 1.0 μm and a porosity of 50% using the equation $S_2 = [50\% \ast 20 \mu m \ast (S_1)]/[T_1 \ast (100\% - P)]$, where $S_1$ is the measured pin puncture strength, $S_2$ is the normalized pin puncture strength, P is the membrane's measured porosity, and $T_1$ is the average thickness of the membrane. Optionally, the membrane's normalized pin puncture strength is ≥1.0×10² mN/μm, e.g., ≥1.5×10² mN/μm or ≥2.0×10² mN/μm, such as in the range of 0.90×10² mN/μm to 2.5×10² mN/μm.

Shutdown Temperature≤140° C.

The microporous membrane's shutdown temperature is measured by the method disclosed in PCT publication WO 2007/052663, which is incorporated by reference herein in its entirety. According to this method, the microporous membrane is exposed to an increasing temperature (5° C./minute beginning at 30° C.) while measuring the membrane's air permeability. The microporous membrane's shutdown temperature is defined as the temperature at which the microporous membrane's air permeability (Gurley Value) first exceeds 1.0×10⁵ seconds/100 cm³. For the purpose of measuring membrane meltdown temperature and shutdown temperature, air permeability can be measured according to JIS P8117 using, e.g., an air permeability meter (EGO-1T available from Asahi Seiko Co., Ltd.). In an embodiment, the shutdown temperature is ≤140.0° C. or ≤130.0° C., e.g., in the range of 128° C. to 133° C.

Meltdown Temperature (as Measured by Membrane Rupture) ≥180.0° C.

In an embodiment, the microporous membrane has a meltdown temperature≥180.0° C., such as ≥190.0° C., e.g., ≥200.0° C. Optionally, the membrane has a meltdown temperature in the range of about 190.0° C. to about 210.0° C., such as in the range of 197.0° C. to 210.0° C. Meltdown temperature can be measured as follows. A sample of the microporous membrane measuring 5 cm×5 cm is fastened along its perimeter by sandwiching the sample between metallic blocks each having a circular opening of 12 mm in diameter. The blocks are then positioned so the plane of the membrane is horizontal. A tungsten carbide ball of 10 mm in diameter is placed on the microporous membrane in the circular opening of the upper block. Starting at 30° C., the membrane is then exposed to an increasing temperature at rate of 5° C./minute. The temperature at which the microporous membrane is ruptured by the ball is defined as the membrane's meltdown temperature.

105° C. TD Heat Shrinkage≤5.0%

In an embodiment, the membrane has a TD heat shrinkage at 105.0° C.≤5.0%, such as ≤0.5%, e.g., in the range of from about 0.01% to about 0.5%. Optionally, the membrane has an MD heat shrinkage at 105.0° C.≤2.5%, e.g., in the range of about 0.5% to about 2.0%.

The membrane's heat shrinkage in orthogonal planar directions (e.g., MD or TD) at 105.0° C. (the "105.0° C. heat shrinkage") is measured as follows: (i) measure the size of a test piece of microporous membrane at 23.0° C. in both MD and TD, (ii) expose the test piece to a temperature of 105.0° C. for 8 hours with no applied load, and then (iii) measure the size of the membrane in both MD and TD. The heat (or "thermal") shrinkage in either the MD or TD can be obtained by dividing the result of measurement (i) by the result of measurement and (ii) expressing the resulting quotient as a percent.

130° C. TD Heat Shrinkage and 170° C. TD Heat Shrinkage

In an embodiment, the membrane has a TD heat shrinkage at 130° C.≤20.0%, such as ≤10.0%, for example in the range of from about 1.0% to about 7.5%. In an embodiment, the membrane has a TD heat shrinkage at 170° C.≤40.0%, such as ≤30.0%, e.g., from about 15.0% to about 40.0%.

The measurement of 130° C. and 170° C. heat shrinkage is slightly different from the measurement of heat shrinkage at 105° C., reflecting the fact that the edges of the membrane parallel to the transverse direction are generally fixed within the battery, with a limited degree of freedom allowed for expansion or contraction (shrinkage) in TD, particularly near the center of the edges parallel to MD. Accordingly, a square sample of microporous film measuring 50 mm along TD and 50 mm along MD is mounted in a frame and exposed to a temperature of 23.0° C., with the edges parallel to TD fixed to the frame (e.g., by tape) leaving a clear aperture of 35 mm in MD and 50 mm in TD. The frame with sample attached is then exposed to a temperature of 130° C. or 170° C. for thirty minutes, and then cooled. TD heat shrinkage generally causes the edges of the film parallel to MD to bow slightly inward (toward the center of the frame's aperture). The shrinkage in TD (expressed as a percent) is equal to the length of the sample in TD before heating divided by the narrowest length (within the frame) of the sample in TD after heating times 100 percent.

This invention will be described in more detail with reference to Examples below without intention of restricting the scope of this invention.

EXAMPLES

Example 1

(1) Preparation of the Polymer-Diluent Mixture

A polymer-diluent mixture is prepared as follows by combining diluent and a polymer blend of PMP, PP, and two polyethylenes, $PE_a$ and $PE_b$. The polymer blend comprises (a) 20.0 wt. % of polymethylpentene (Mitsui Chemicals, Inc. TPX: MX002) having an MFR of 21 dg/min and a Tm of 222° C. (PMP), (b) 10.0 wt. % of isotactic PP having an Mw of 1.1×10⁶ and a ΔHm of 114 J/g (PP1), (c) 40.0 wt. % of PE having an Mw of 5.6×10⁵, an amount of terminal unsaturations≤0.14 per 1.0×10⁴ carbon atoms, and a Tm of 136.0° C. (PE1), and (d) 30.0 wt. % of PE having a Mw of 1.9×10⁶ and a Tm of 136.0° C. (PE4), the weight percents being based on the weight of the combined polymer.

Next, 25.0 wt. % of the polymer blend is charged into a strong-blending double-screw extruder having an inner diameter of 58 mm and L/D of 42, and 75.0 wt. % liquid paraffin (50 cst at 40° C.) is supplied to the double-screw extruder via a side feeder. Mixing is conducted at 220° C. and 200 rpm to produce the polymer-diluent mixture, the weight percents being based on the weight of the polymer-diluent mixture.

(2) Production of Membrane

The polymer-diluent mixture is conducted from the extruder to a sheet-forming die, to form an extrudate (in the form of a sheet). The die temperature is 210° C. The extrudate is cooled by contact with cooling rollers controlled at 20° C. The cooled extrudate is simultaneously biaxially stretched (upstream stretching) at 115° C. to a magnification of 5 fold in both MD and TD by a tenter-stretching machine. The stretched sheet is fixed to an aluminum frame of 20 cm×20 cm, immersed in a bath of methylene chloride controlled at 25° C. to remove liquid paraffin with vibration of 100 rpm for 3 minutes, and dried by air flow at room temperature. While holding the size of the membrane substantially constant, the membrane is then heat-set at 125° C. for 10 minutes to produce the final microporous membrane. Selected starting materials, process conditions, and membrane properties are set out in Table 1.

Examples 2-8 and Comparative Examples 1-16

Example 1 is repeated except as noted in Table 1. Starting materials and process conditions are the same as are used in Example 1, except as noted in the Table. For example, PP1 is replaced by a polypropylene having an Mw=5.3×10$^5$ and a ΔHm of 114 J/g (PP2) in Example 2; PE1 is replaced by a PE having an Mw=7.46×10$^5$, a Tm of 134.0° C., and a terminal unsaturation amount≥0.20 per 1.0×10$^4$ carbon atoms in Examples 7 and 8.

TABLE 1

| | | Example No. | | | | | | | |
|---|---|---|---|---|---|---|---|---|---|
| | | 1 | 2 | 3 | 4 | 5 | 6 | 7 | 8 |
| PMP | Content (wt. %) | 20.0 | 20.0 | 20.0 | 20.0 | 20.0 | 20.0 | 20.0 | 20.0 |
| PP | Grade | PP1 | PP2 | PP1 | PP1 | PP1 | PP1 | PP1 | PP1 |
| | Content (wt. %) | 10.0 | 10.0 | 20.0 | 20.0 | 20.0 | 5.0 | 10.0 | 10.0 |
| PE | Grades | PE1 | PE1 | PE1 | PE1 | PE1 | PE1 | PE2 | PE2 |
| | Content (wt. %) | 40.0 | 40.0 | 30.0 | 30.0 | 30.0 | 57.0 | 40.0 | 52.0 |
| | | PE4 | PE4 | PE4 | PE4 | PE4 | PE4 | PE4 | PE4 |
| | | 30.0 | 30.0 | 30.0 | 30.0 | 30.0 | 18.0 | 30.0 | 18.0 |
| Processing Condition | | | | | | | | | |
| Polymer content (wt. %) polymer-diluent mixture Extrution | | 25 | 25 | 28.5 | 28.5 | 28.5 | 25 | 25 | 25 |
| Extrusion Temperature (° C.) | | 220 | 220 | 220 | 220 | 220 | 220 | 220 | 220 |
| Stretching Temperature (° C.) | | 115 | 115 | 114 | 114 | 114 | 115 | 115 | 115 |
| Magnification (MD × TD) | | 5 × 5 | 5 × 5 | 5 × 5 | 5 × 5 | 5 × 5 | 5 × 5 | 5 × 5 | 5 × 5 |
| Dry Orientation Temperature (° C.) | | — | — | — | 125 | 125 | — | — | — |
| Magnification | | — | — | — | 1.2 | 1.4 | — | — | — |
| Properties | | | | | | | | | |
| Average Thickness (μm) | | 22 | 24 | 21 | 21 | 19 | 21 | 22 | 19 |
| Porosity (%) | | 38 | 43 | 42 | 46 | 46 | 38 | 37 | 35 |
| Normalized Air Permeability (sec/100 cm$^3$/μm) | | 37.4 | 37.1 | 40.3 | 23.3 | 22.9 | 54.7 | 68.2 | 68.5 |
| Puncture Strength (mN/μm) | | 134.5 | 92.5 | 136.6 | 138.1 | 157.4 | 136.7 | 161.4 | 158.4 |
| TD Heat Shrinkage at 105° C. (%) | | 3.1 | 2.9 | 4.1 | 7.1 | 7.4 | 2.6 | 3.0 | 2.3 |
| TD Heat Shrinkage at 130° C. (%) | | 14 | 14 | 15 | 21 | 23 | 13 | 16 | 14 |
| TD Heat Shrinkage at 170° C. (%) | | 33 | 33 | 30 | 36 | 42 | 22 | 38 | 32 |
| Meltdown Temperature (° C.) | | 200 | 197 | 205 | 198 | 202 | 204 | 201 | 199 |

| | | Comparative Example No. | | | | | | | |
|---|---|---|---|---|---|---|---|---|---|
| | | 1 | 2 | 3 | 4 | 5 | 6 | 7 | 8 |
| PMP | Content (wt. %) | 10.0 | 30.0 | 25.0 | 30.0 | 10.0 | 10.0 | 10.0 | 40.0 |
| PP | Grade | PP1 | PP1 | PP1 | PP1 | PP1 | PP1 | PP1 | PP1 |
| | Content (wt. %) | 10.0 | 10.0 | 15.0 | 5.0 | 20.0 | 35.0 | 45.0 | 5.0 |
| PE | Grades | PE1 | PE1 | PE1 | PE1 | PE1 | PE1 | PE1 | PE1 |
| | Content (wt. %) | 62.0 | 42.0 | 42.0 | 47.0 | 52.0 | 37.0 | 27.0 | 37.0 |
| | | PE4 | PE4 | PE4 | PE4 | PE4 | PE4 | PE4 | PE4 |
| | | 18.0 | 18.0 | 18.0 | 18.0 | 18.0 | 18.0 | 18.0 | 18.0 |
| Processing Condition | | | | | | | | | |
| Polymer content (wt. %) polymer-diluent mixture Extrution | | 25 | 25 | 25 | 25 | 25 | 25 | 25 | 25 |
| Extrusion Temperature (° C.) | | 220 | 220 | 220 | 220 | 220 | 220 | 220 | 220 |
| Stretching Temperature (° C.) | | 115 | 115 | 115 | 115 | 115 | 115 | 115 | 115 |
| Magnification (MD × TD) | | 5 × 5 | 5 × 5 | 5 × 5 | 5 × 5 | 5 × 5 | 5 × 5 | 4 × 4 | 4 × 4 |
| Dry Orientation Temperature (° C.) | | — | — | — | — | — | — | — | — |
| Magnification | | — | — | — | — | — | — | — | — |
| Properties | | | | | | | | | |
| Average Thickness (μm) | | 21 | 21 | 20 | 20 | 21 | 33 | 51 | 31 |
| Porosity (%) | | 37 | 38 | 37 | 33 | 39 | 55 | 58 | 34 |
| Normalized Air Permeability (sec/100 cm$^3$/μm) | | 29.60 | 443.1 | 158.6 | 488.2 | 19.70 | 6.60 | 3.1 | 204.2 |
| Puncture Strength (mN/μm) | | 163.3 | 91.42 | 102.0 | 128.0 | 144.8 | 25.45 | 10.39 | 46.77 |
| TD Heat Shrinkage at 105° C. (%) | | 3.0 | 2.7 | 2.5 | 2.2 | 3.4 | 2.7 | 2.6 | — |
| TD Heat Shrinkage at 130° C. (%) | | 17 | 9 | 8 | 19 | 16 | 11 | — | — |
| TD Heat Shrinkage at 170° C. (%) | | 34 | 21 | 23 | 27 | 36 | 32 | — | — |
| Meltdown Temperature (° C.) | | 177 | 207 | 203 | 204 | 177 | 181 | 184 | 213 |

| | | Comparative Example No. | | | | | | | |
|---|---|---|---|---|---|---|---|---|---|
| | | 9 | 10 | 11 | 12 | 13 | 14 | 15 | 16 |
| PMP | Content (wt. %) | 40.0 | 30.0 | 20.0 | — | 30.0 | 30.0 | 35.0 | 20.0 |
| PP | Grade | PP1 | PP1 | PP1 | PP1 | PP1 | PP1 | PP1 | PP1 |
| | Content (wt. %) | 20.0 | 30.0 | 40.0 | 10.0 | 0.0 | 0.0 | 10.0 | 35.0 |
| PE | Grades | PE1 | PE1 | PE1 | PE1 | PE1 | PE1 | PE1 | PE1 |

TABLE 1-continued

| Content (wt. %) | 22.0 PE4 18.0 | 22.0 PE4 18.0 | 22.0 PE4 18.0 | 85.0 PE4 5.0 | 52.0 PE4 18.0 | 40.0 PE4 30.0 | 37.0 PE4 18.0 | 27.0 PE4 18.0 |
|---|---|---|---|---|---|---|---|---|
| Processing Condition | | | | | | | | |
| Polymer content (wt. %) polymer-diluent mixture Extruction | 25 | 25 | 25 | 37.5 | 25 | 25 | 25 | 25 |
| Extrusion Temperature (° C.) | 220 | 220 | 220 | 210 | 220 | 220 | 220 | 220 |
| Stretching Temperature (° C.) | 115 | 115 | 115 | 115 | 115 | 115 | 115 | 115 |
| Magnification (MD × TD) | 3 × 3 | 3 × 3 | 3 × 3 | 5 × 5 | 5 × 5 | 5 × 5 | 4 × 4 | 4 × 4 |
| Dry Orientation Temperature (° C.) | — | — | — | — | — | — | — | — |
| Magnification | — | — | — | — | — | — | — | — |
| Properties | | | | | | | | |
| Average Thickness (μm) | 68 | 74 | 100 | 16 | 23 | 21 | 35 | 46 |
| Porosity (%) | 42 | 50 | 62 | 32 | 36 | 36 | 35 | 53 |
| Normalized Air Permeability (sec/100 cm³/μm) | 270.3 | 33.05 | 2.30 | 25.20 | 776.8 | 106.0 | 162.3 | 18.1 |
| Puncture Strength (mN/μm) | 7.50 | 5.40 | 2.50 | 197.5 | 86.52 | 142.4 | 39.71 | 16.74 |
| TD Heat Shrinkage at 105° C. (%) | — | — | — | 4.9 | 2.5 | 3.0 | 2.2 | 2.6 |
| TD Heat Shrinkage at 130° C. (%) | — | — | — | 23 | 7 | 13 | — | — |
| TD Heat Shrinkage at 170° C. (%) | — | — | — | — | 29 | 29 | — | — |
| Meltdown Temperature (° C.) | 211 | 205 | 203 | 177 | 207 | 207 | 210 | 204 |

Discussion

Examples 1-8 show that microporous membrane having meltdown temperature≥180.0° C., a normalized air permeability≤75.0 seconds/100 cm³/μm, and a pin puncture strength≥1.0×10² mN/μm can be produced from PMP, PP, and PE. Using isotactic PP having a relatively high ΔHm (PP1) results in improved membrane strength as can be seen by comparing Examples 1 and 2. Using PE having a terminal unsaturation amount≥0.20 per 1.0×10⁴ carbon atoms leads to a decrease in air permeability, as is shown by Examples 7 and 8. Subjecting the membrane to downstream orientation results in improved strength and permeability, as can be seen by comparing (a) Examples 4 and 5 with (b) Examples 1-3. Improved meltdown temperature is observed when the total amount of PMP+PP in the membrane is ≥25.0 wt. %, based on the weight of the membrane, as shown by Comparative example 1. Comparative examples 2, 3, 4, 8, 9, 10, and 15 show that membrane permeability can decrease when the amount of PMP in the membrane is ≥25.0 wt. %, based on the weight of the membrane. Comparative examples 5, 6, 7, 11, and 16 show that when the amount of PP (wt. %) is >the amount of PMP (wt. %) in the membrane, the membrane can have lower meltdown temperature and/or strength. Comparative example 12 shows that PMP results in improved meltdown temperature. Comparative examples 13 and 14 shows that omitting PP can result in decreased air permeability.

Example 9

A polymer blend is prepared in the same manner as the polymer blend of Example 1. The blend comprises (a) 20.0 wt. % of polymethylpentene (Mitsui Chemicals, Inc. TPX: MX002) having an MFR of 21 dg/min and a Tm of 222° C. (PMP), (b) 20.0 wt. % of isotactic PP having an Mw of $1.1 \times 10^6$ and a ΔHm of 114 J/g (PP1), (c) 30.0 wt. % of PE having an Mw of $5.6 \times 10^5$, an amount of terminal unsaturation≤0.14 per $1.0 \times 10^4$ carbon atoms, and a Tm of 136.0° C. (PE1), and (d) 30.0 wt. % of PE having a Mw of $1.9 \times 10^6$ and a Tm of 136.0° C. (PE4), the weight percents being based on the weight of the combined polymer.

Next, 28.5 wt. % of the polymer blend is charged into a strong-blending double-screw extruder having an inner diameter of 58 mm and L/D of 42, and 71.5 wt. % liquid paraffin (50 cst at 40° C.) is supplied to the double-screw extruder via a side feeder. Mixing is conducted at 225° C., 200 rpm, and a mixing energy of 0.167 KWh/kg to produce the polymer-diluent mixture, the weight percents being based on the weight of the polymer-diluent mixture. The polymer-diluent mixture is conducted from the extruder to a sheet-forming die to form an extrudate in the form of a sheet. The die temperature is 210° C. The extrudate is cooled by contact with cooling rollers controlled at 20° C. The cooled extrudate is simultaneously biaxially stretched (upstream stretching) by a tenter-stretching machine while exposing the extrudate at 115° C. to attempt a magnification of 5 fold in both MD and TD. The film tears at a magnification of 4.5×4.5 (e.g., before the desired stretching magnification of 5×5 can be achieved), as noted in Table 2.

TABLE 2

| Example No. | Mixing Temp., ° C. | Mixer rpm | Mixing Energy kg/kW | Upstream Stretching result |
|---|---|---|---|---|
| 9 | 225 | 200 | 0.167 | 4.5 × 4.5 |
| 10 | 223 | 200 | 0.180 | 4.5 × 4.5 |
| 11 | 224 | 200 | 0.208 | 5 × 5 |
| 12 | 224 | 200 | 0.267 | 5 × 5 |
| 13 | 229 | 300 | 0.200 | 4 × 4 |
| 14 | 228 | 300 | 0.388 | 5 × 5 |
| 15 | 230 | 400 | 0.391 | 4 × 4 |
| 16 | 232 | 400 | 0.500 | 3 × 3 |
| 17 | 233 | 450 | 0.667 | Tear |

Examples 10-17

Example 9 is repeated except as noted in Table 2, and the largest stretching magnification factor that can be achieved without tearing is specified in the table. For example, in Example 10, the mixing is conducted at a mixing temperature of 223° C., and a mixing energy of 0.180 KWh/kg. The largest upstream orientation magnification that can be achieved without extrudate tearing in 4.5×4.5 (MD×TD) as specified in the table.

Discussion

Increasing the amount of upstream orientation increases yield of the final membrane (Kg/second) and results in greater membrane strength. The results of Table 2 show that the largest upstream stretching magnification factor that can be obtained without tearing is 5×5 (MD×TD), which is achieved when the mixing energy is ≤0.50 KWh/kg, e.g., in the range of 0.20 KWh/kg<mixing energy≤0.39 KWh/kg.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

The invention claimed is:

1. A microporous membrane comprising polymethylpentene, polypropylene, and polyethylene, and having a meltdown temperature≥180.0° C., a normalized air permeability≤75.0 seconds/100 cm$^3$/μm, and a pin puncture strength≥0.90×10$^2$ mN/μm, wherein the polymethylpentene, polypropylene, and polyethylene are present in an amount of 5.0 wt. %≤polymethylpentene≤25.0 wt. %, 5.0 wt. %≤polypropylene≤25.0 wt. %, and 50.0 wt. %<polyethylene≤90.0 wt. %, the weight percents being based on the weight of the membrane, the amount of polymethylpentene in wt % is ≥the polypropylene amount in wt. % and the polymethylpentene and polypropylene are present in the membrane in a combined amount≥25.0 wt. %, based on the weight of the membrane.

2. The microporous membrane of claim 1, wherein the membrane has a TD heat shrinkage at 105° C.≤5.0%, a TD heat shrinkage at 130° C.<20.0%, a TD heat shrinkage at 170° C.≤40.0%, a thickness≤30.0 μm, and a porosity of 20% to 80%.

3. The microporous membrane of claim 1, wherein the polymethylpentene has a Tm≥200.0° C., and an MFR≤80.0 dg/min.

4. The microporous membrane of claim 1, wherein the polypropylene is an isotactic polypropylene having an Mw≥6.0×10$^5$, an MWD≤8.5 and a ΔHm≥90.0 J/g.

5. The microporous membrane of claim 1, wherein the polyethylene has an Mw of 1.0×10$^5$ to 2.0×10$^6$ and a Tm≥130.0° C.

6. The microporous membrane of claim 1, wherein the polymethylpentene has an MFR of 22.0 dg/min to 28.0 dg/min and a Tm of 223.0° C. to 230.0° C.

7. The microporous membrane of claim 1, wherein the polyethylene has an amount of terminal unsaturation≤0.14 per 1.0×10$^4$ carbon atoms.

8. A battery separator film comprising the microporous membrane of claim 1.

* * * * *